(12) United States Patent
Ohmura

(10) Patent No.: US 11,186,275 B2
(45) Date of Patent: Nov. 30, 2021

(54) VEHICLE CONTROL SYSTEM

(71) Applicant: MAZDA MOTOR CORPORATION, Hiroshima (JP)

(72) Inventor: Hiroshi Ohmura, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 588 days.

(21) Appl. No.: 15/677,480

(22) Filed: Aug. 15, 2017

(65) Prior Publication Data

US 2018/0065627 A1 Mar. 8, 2018

(30) Foreign Application Priority Data

Sep. 5, 2016 (JP) .............................. JP2016-173067

(51) Int. Cl.
*B60W 30/00* (2006.01)
*B60W 30/095* (2012.01)
(Continued)

(52) U.S. Cl.
CPC .......... *B60W 30/095* (2013.01); *B60W 10/06* (2013.01); *B60W 10/18* (2013.01);
(Continued)

(58) Field of Classification Search
CPC ......... B60W 30/095; B60W 30/18163; B60W 30/16; B60W 30/10; B60W 10/18;
(Continued)

(56) References Cited

U.S. PATENT DOCUMENTS 7,069,146 B2 6/2006 Yamamura et al.
7,979,174 B2 * 7/2011 Fregene ................ B60W 30/16
701/23

(Continued)

FOREIGN PATENT DOCUMENTS

JP 2007-99237 A 4/2007
JP 2011-051547 A 3/2011
(Continued)

OTHER PUBLICATIONS

An Office Action issued by the Japanese Patent Office dated Feb. 26, 2018, which corresponds to Japanese Patent Application No. 2016-173067 and is related to U.S. Appl. No. 15/677,480.
(Continued)

*Primary Examiner* — Ian Jen
(74) *Attorney, Agent, or Firm* — Studebaker & Brackett PC

(57) ABSTRACT

Provided is a vehicle control device capable of efficiently performing vehicle control for safe driving assistance. A vehicle control device (ECU) (10) mounted in a vehicle is configured to: detect a stopped vehicle (3) located forward of the vehicle (1) in a traveling lane of the vehicle (1); set a speed distribution area (40) which defines a distribution of an allowable upper limit value of a relative speed of the vehicle (1) with respect to the stopped vehicle (3); detect a traveling state of a vehicle traveling in an adjacent lane of the vehicle (1); and, based on the traveling state of the vehicle in the adjacent lane and the speed distribution area (40) with respect to the stopped vehicle (3), execute an avoidance control of avoiding a collision with the stopped vehicle (3).

21 Claims, 10 Drawing Sheets

(51) Int. Cl.
| | |
|---|---|
| *B60W 30/18* | (2012.01) |
| *B60W 30/16* | (2020.01) |
| *B60W 30/10* | (2006.01) |
| *B60W 10/18* | (2012.01) |
| *B60W 10/06* | (2006.01) |
| *B60W 30/14* | (2006.01) |
| *B60W 30/08* | (2012.01) |
| *B60W 10/20* | (2006.01) |
| *B60W 30/09* | (2012.01) |
| *B60W 40/04* | (2006.01) |

(52) U.S. Cl.
CPC ............ *B60W 10/20* (2013.01); *B60W 30/08* (2013.01); *B60W 30/09* (2013.01); *B60W 30/10* (2013.01); *B60W 30/14* (2013.01); *B60W 30/16* (2013.01); *B60W 30/18163* (2013.01); *B60W 40/04* (2013.01); *B60W 2420/42* (2013.01); *B60W 2420/52* (2013.01); *B60W 2520/10* (2013.01); *B60W 2554/00* (2020.02); *B60W 2554/80* (2020.02); *B60W 2556/50* (2020.02)

(58) Field of Classification Search
CPC ...... B60W 10/06; B60W 30/14; B60W 30/08; B60W 10/20; B60W 30/09; B60W 40/04; B60W 2420/42; B60W 2520/10; B60W 2420/52; B60W 30/0956; B60W 2720/00
See application file for complete search history.

(56) References Cited

U.S. PATENT DOCUMENTS 9,272,710 B2 * 3/2016 Jeon .......................... B60T 7/12
2010/0256836 A1 * 10/2010 Mudalige ............... G08G 1/164
701/2

FOREIGN PATENT DOCUMENTS

| JP | 2015-160554 A | 9/2015 |
| JP | WO2016/024318 A1 | 5/2017 |
| WO | 2016050253 A1 | 4/2016 |

OTHER PUBLICATIONS

An Office Action mailed by the State Intellectual Property Office of the People's Republic of China dated Sep. 16, 2019, which corresponds to Chinese Patent Application No. 201710717193.6 and is related to U.S. Patent Application Mo. U.S. Appl. No. 15/677,480.
An Office Action mailed by the State Intellectual Property Office of the People's Republic of China dated Aug. 3, 2020, which corresponds to Chinese Patent Application No. 201710717193.6 and is related to U.S. Appl. No. 15/677,480 with English language Concise Explanation.

* cited by examiner

VEHICLE CONTROL SYSTEM

TECHNICAL FIELD

The present invention is related to a vehicle control system, and more particularly to a vehicle control system for assisting a safe travelling of a vehicle.

BACKGROUND ART

Heretofore, a plurality of safe driving assistance systems including a lane keeping assist system and an automatic cruise control system have been equipped in a vehicle. Each of these systems uses an automatic brake control, a steering assist control or the like. Thus, there are some cases where a brake request signal for performing the automatic brake control and a steering request signal for performing the steering assist control are outputted from the respective system. For example, the brake request signals can be outputted respectively from different systems at different timings. In such a case, one of the plurality of request signals will be prioritized (see, for example, Patent Document 1).

CITATION LIST

Patent Document

Patent Document 1: JP 2011-051547 A

SUMMARY OF INVENTION

Technical Problem

However, if the safe driving assistance system becomes more complicated in the future, the safe driving assistance system would possibly fail to effectively function as a whole by merely prioritizing one of the request signals.

The present invention is to solve such a problem, and an object thereof is to provide a vehicle control system capable of efficiently executing vehicle control for safe driving assistance.

Solution to the Technical Problem

In order to achieve the above object, the present invention provides a vehicle control system used for a vehicle configured to: detect a stopped vehicle ahead of the vehicle in a traveling lane of the vehicle; set a speed distribution area which defines a distribution of an allowable upper limit value of a relative speed of the vehicle with respect to the stopped vehicle; detect a traveling state of a vehicle traveling in an adjacent lane of the vehicle; and based on the traveling state of the vehicle in the adjacent lane and the speed distribution area with respect to the stopped vehicle, execute an avoidance control for avoiding a collision with the stopped vehicle.

The vehicle control system of the present invention is configured to execute the avoidance control, based on the traveling state of the vehicle in the adjacent lane and the speed distribution area with respect to the stopped vehicle, so that the avoidance control is executed, for example, depending on the traveling state of the vehicles in the adjacent lane and the speed distribution area with respect to the stopped vehicle, in such a manner as to, when it is possible to make a lane change, change the traveling lane to the adjacent lane, or to, when it is impossible to make a lane change, maintain the traveling lane while keeping a safe distance and vehicle speed with respect to the stopped vehicle. Thus, it becomes possible to execute the avoidance control while keeping the safe distance and vehicle speed with respect to the stopped vehicle, to provide safe driving assistance by simple and efficient vehicle speed control.

Preferably, the vehicle control system of the present invention is further configured to: control the vehicle to travel to follow a preceding vehicle traveling ahead of the vehicle; and, when the preceding vehicle changes a lane to the adjacent lane, perform the detection of the stopped vehicle, the setting of the speed distribution area, the detection of the traveling state of the vehicle in the adjacent lane, and the execution of the avoidance control.

When a preceding vehicle followed by the vehicle changes a lane to the adjacent lane, there is a possibility that a stopped vehicle exists ahead in the lane along which the preceding vehicle has traveled. According to the above feature, in this situation, it is possible to perform the detection of the stopped vehicle, the setting of the speed distribution area, and the detection of the traveling state of the vehicle in the adjacent lane, and, based on results of the detections and setting, execute the avoidance control, to provide a safe driving assistance system reliably and efficiently.

Preferably, in the vehicle control system of the present invention, the traveling state of the vehicle in the adjacent lane includes a presence or absence of a rearward/lateral vehicle traveling behind or beside the vehicle in the adjacent lane, and the avoidance control is configured to, when there is the rearward/lateral vehicle, change a vehicle speed of the vehicle based on the speed distribution area while maintaining the traveling lane of the vehicle.

When there is a rearward/lateral vehicle in the adjacent lane, it is difficult for the vehicle to change the lane to the adjacent lane. According to the above feature, in this situation, the vehicle control system is operable to change the vehicle speed of the vehicle based on the speed distribution area with respect to the stopped vehicle, while maintaining the traveling lane of the vehicle. This makes it possible for the vehicle to travel while keeping a safe distance and vehicle speed with respect to the stopped vehicle, and avoiding an unreasonable lane change.

Preferably, in vehicle control system of the present invention, the traveling state of the vehicle in the adjacent lane includes a presence or absence of a rearward/lateral vehicle traveling behind or beside the vehicle in the adjacent lane, and a presence or absence of a forward vehicle traveling ahead of the vehicle in the adjacent lane, and the avoidance control is configured to, when there is neither the rearward/lateral vehicle nor the forward vehicle, change the traveling lane of the vehicle to the adjacent lane based on the speed distribution area.

According to this feature, the vehicle control system is operable, when there is neither the rearward/lateral vehicle nor the forward vehicle in the adjacent lane, to determine that a space for allowing the vehicle to change the lane is ensured, and then cause the vehicle to make a lane change. In this process, the lane change is made based on the speed distribution area with respect to the stopped vehicle, so that it is possible to cause the own vehicle to make a lane change while keeping a safe distance and vehicle speed with respect to the stopped vehicle.

Preferably, in the vehicle control system of the present invention, the traveling state of the vehicle in the adjacent lane includes a presence or absence of a rearward/lateral vehicle traveling behind or beside the vehicle in the adjacent lane, and the presence or absence of a forward vehicle traveling ahead of the vehicle in the adjacent lane, and the avoidance control is configured to, when there is not the rearward/lateral vehicle, but there is the forward vehicle, change the traveling lane of the vehicle to the adjacent lane at a position rearward of the forward vehicle, based on the speed distribution area.

When there is not a rearward/lateral vehicle but there is a forward vehicle, in the adjacent lane, it is difficult for the vehicle to change the lane ahead of the forward vehicle. Thus, according to the above feature, the vehicle control system is operable to cause the vehicle to make a lane change behind the forward vehicle. In this process, the lane change is made based on the speed distribution area with respect to the stopped vehicle, so that it is possible for the vehicle to change the lane while keeping a safe distance and vehicle speed with respect to the stopped vehicle.

Preferably, in the vehicle control system of the present invention, the avoidance control is configured to change the vehicle speed and/or a steering direction of the vehicle such that the relative speed of the vehicle in the speed distribution area does not exceed the allowable upper limit value.

According to this feature, in order to prevent the relative speed of the vehicle with respect to the stopped vehicle from exceeding the allowable upper limit value set in the speed distribution area, the avoidance control may be configured to change (reduce) the vehicle speed itself of the vehicle, or may be configured to change the steering direction to change a traveling course so as to enable the vehicle to pass through an area having a larger allowable upper limit value, or may be configured to change both of the vehicle speed and the steering direction.

Preferably, in the vehicle control system of the present invention, the avoidance control is configured to calculate a course of the vehicle based on the speed distribution area.

According to this feature, the vehicle can travel on a safe course, in relation to the stopped vehicle.

Preferably, in the vehicle control system of the present invention, the speed distribution area is set such that the allowable upper limit value becomes lower as a lateral distance from the stopped vehicle becomes smaller.

According to this feature, the speed distribution area is set such that the allowable upper limit value becomes lower as the lateral distance from the stopped vehicle becomes smaller, so that, when the vehicle passes by the stopped vehicle at a position away from the stopped vehicle, the relative speed is allowed to be a relatively large value, whereas, when the vehicle passes by the stopped vehicle at a position close to the stopped vehicle, the relative speed is limited to a relatively small value. That is, in the present invention, the allowable upper limit value of the relative speed is controlled according to the distance from the stopped vehicle. This makes it possible to provide a safe driving assistance by simple and efficient vehicle speed control.

Preferably, in the vehicle control system of the present invention, the speed distribution area is set with respect to a range from a lateral region to a rearward region of the stopped vehicle, such that the allowable upper limit value becomes lower as a lateral distance and a longitudinal distance from the stopped vehicle becomes smaller.

According to this feature, when the vehicle is traveling behind or obliquely behind the stopped vehicle, the allowable upper limit value of the relative speed is also set by extensionally applying the above control rule for a case when passing by the stopped vehicle. Thus, in the present invention, it becomes possible to maintain a safe relative speed by simple and efficient control, even when the vehicle is traveling at a position behind or obliquely behind the stopped vehicle.

Preferably, in the vehicle control system of the present invention, the speed distribution area is set such that the allowable upper limit value becomes zero at a position away from the stopped vehicle by a given safe distance.

According to this feature, the vehicle control system is configured to prohibit the vehicle from approaching the stopped vehicle closer to a position away from the stopped vehicle by a safe distance. Thus, in the present invention, it becomes possible to prevent a collision between the vehicle and the stopped vehicle, even when the stopped vehicle moves in a direction approaching the vehicle, such as when the stopped vehicle is suddenly started.

Effect of Invention

The present invention makes it possible to provide a vehicle control system capable of efficiently performing vehicle control for safe driving assistance.

DESCRIPTION OF EMBODIMENTS

Figure 1:
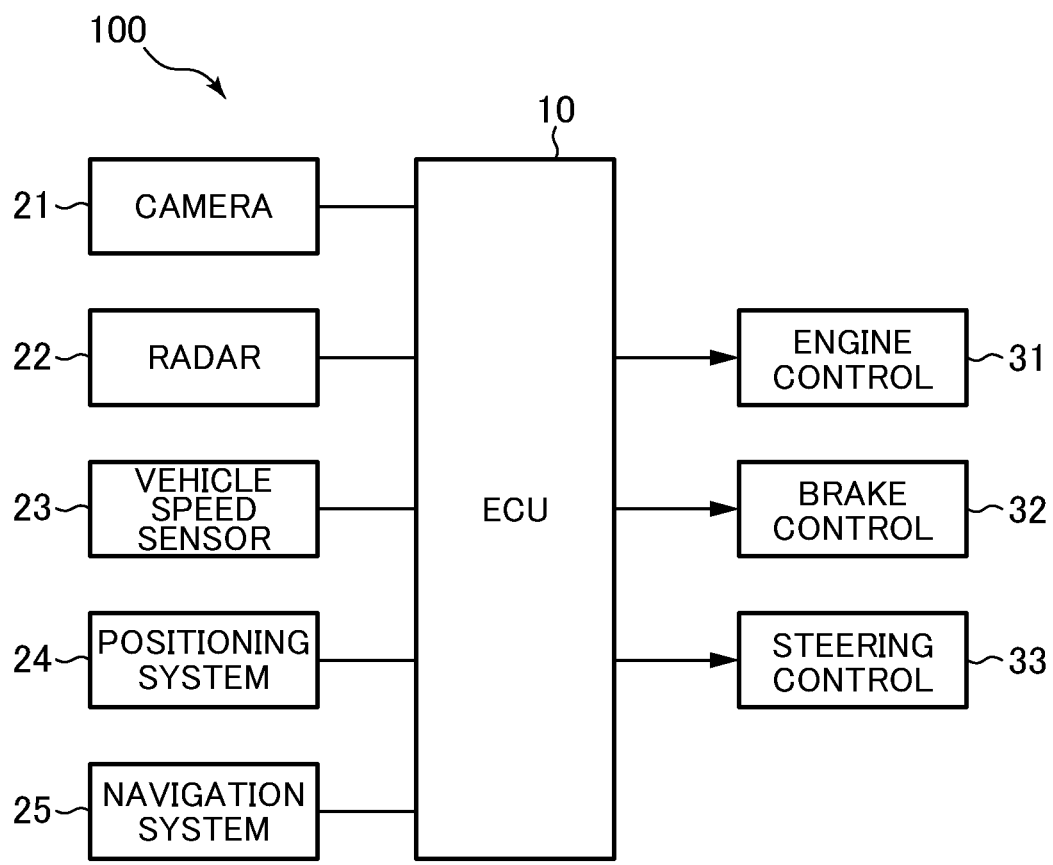
FIG. 1 is a block diagram depicting a configuration of a vehicle control system according to one embodiment of the present invention.
Figure 11:
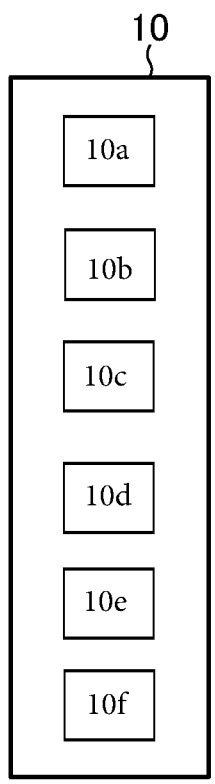
FIG. 11 is a block diagram depicting a configuration of a vehicle control device of the vehicle control system.

With reference to the accompanying drawings, a vehicle control system according to an embodiment of the present invention will now be described. First of all, with reference to FIG. 1, a configuration of the vehicle control system will be described. FIG. 1 is a block diagram depicting a configuration of a vehicle control system. FIG. 11 is a block diagram depicting a configuration of a vehicle control device of the vehicle control system.

As depicted in FIG. 1, the vehicle control system 100 mounted in a vehicle 1 (see FIG. 3) comprises a vehicle control device (ECU) 10, a plurality of sensors, and a plurality of vehicle control subsystems. The plurality of sensors includes a vehicle-mounted camera 21, a millimeter-wave radar 22, a vehicle speed sensor 23, a positioning system 24, and a navigation system 25. The plurality of vehicle control subsystems includes an engine control system 31, a brake control system 32, and a steering control system 33.

The ECU 10 is composed of a computer which comprises a CPU, a memory for storing various programs, and an input/output device. The ECU 10 is configured to be capable of, based on signals received from the plurality of sensors, outputting request signals, respectively, to the engine control system 31, the brake control system 32 and the steering control system 33 so as to appropriately operate corresponding ones of an engine system, a brake system and a steering system. As shown in FIG. 11, the ECU 10 functionally comprises a data acquisition section 10a, an object detection section 10b, a position and relative speed calculation section 10c, a speed distribution area setting section 10d, a course calculation section 10e, and an avoidance control execution section 10f.

The vehicle-mounted camera 21 is operable to take images around the vehicle 1 and output taken image data. The ECU 10 is operable, based on the image data, to determine an object (for example, a preceding vehicle). Moreover, the ECU 10 can be operable to determine a travelling direction or a forward/rearward direction of the object from the image data.

The millimeter-wave radar 22 is a measuring device for measuring a position and a speed of the object, and is operable to transmit a radio wave (transmitted wave) toward a forward region with respect to the vehicle 1, and receive a reflection wave arising from reflection of the transmission wave by the object. The millimeter-wave radar 22 is operable, based on the transmitted wave and the received wave, to measure a distance between the vehicle 1 and the object (e.g., inter-vehicle distance), and a relative speed of the object with respect to the vehicle 1. Alternatively, the vehicle control system according to this embodiment may be configured to measure the distance or the relative speed with respect to the object, using a laser radar, an ultrasonic sensor or the like, instead of the millimeter-wave radar 22. Further, a position and speed measuring device may be constructed using a plurality of sensors.

The vehicle speed sensor 23 is operable to calculate an absolute speed of the vehicle 1.

The positioning system 24 is a GPS system and/or a gyroscope system, and is operable to calculate a position (current vehicle position information) of the vehicle 1.

The navigation system 25 internally stores map information, and is capable of providing the map information to the ECU 10. The ECU 10 is operable, based on the map information and the current vehicle position information of the vehicle 1, to identify roads, signals, buildings, and the like which exist around the vehicle 1 (particularly forwardly in a traveling direction of the vehicle 1). In addition, the ECU 10 may be operable, based on the map information, to identify cliffs, grooves, holes or the like which are difficult to be identified from the image data by the vehicle-mounted camera 21. The map information may be stored in the ECU 10.

The engine control system 31 comprises a controller for controlling an engine of the vehicle 1. The ECU 10 is operable, when it is necessary to accelerate or decelerate the vehicle 1, to output, to the engine control system 31, an engine output change request signal for requesting change of a power output of the engine.

The brake control system 32 comprises a controller for controlling a brake device of the vehicle 1. The ECU 10 is operable, when it is necessary to decelerate the vehicle 1, to output, to the brake control system 32, a braking request signal for requesting generation of a braking force against the vehicle 1.

The steering control system 33 comprises a controller for controlling a steering device of the vehicle 1. The ECU 10 is operable, when it is necessary to change the traveling direction of the vehicle 1, to output, to the steering control system 33, a steering direction change request signal for requesting change of a steering direction of the vehicle 1.

Next, a vehicle speed control of the vehicle control system 100 according to the present embodiment will be described.

Generally, when a traveling vehicle catches up with an object (for example, a preceding vehicle, a parked vehicle, a guard rail, etc.), or passes by (or overtakes) the object on or around a road, a driver of the vehicle performs an operation to decelerate the vehicle while maintaining a given clearance or interval between the vehicle and the object to a traveling direction of the vehicle. Specifically, in order to avoid the danger such as the preceding vehicle suddenly changes a pathway, a pedestrian comes out from a blind area of the road, or a door of the parked vehicle opens, the relative speed of the vehicle with respect to the object is reduced to a smaller value as the distance from the object is smaller.

Generally, when the traveling vehicle is approaching the object such as a preceding vehicle from behind thereof, the driver of the vehicle adjusts the speed (relative speed) thereof according to an inter-vehicle distance (longitudinal distance) along the traveling direction. Specifically, when the inter-vehicle distance becomes larger, the approaching speed (relative speed) is maintained high, but when the inter-vehicle distance becomes smaller, the approaching speed is reduced to a smaller value. Then, the relative speed between the traveling vehicle and the object becomes zero at the given inter-vehicle distance. This applies not only to a case where the object is the preceding vehicle, but also to a case where the object is the parked vehicle, the guard rail, or the like.

As above, a driver drives a vehicle to avoid dangers while taking into account a relationship between a distance (including a lateral distance and a longitudinal distance) between an object and the vehicle, and a relative speed between the object and the vehicle.

Figure 2:
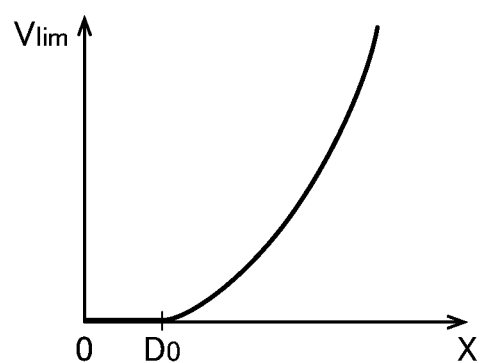
FIG. 2 is an explanatory diagram depicting a relationship between an allowable upper limit value of a relative speed and a clearance with respect to an object vehicle in the vehicle control system according to this embodiment.

FIG. 2 is an explanatory diagram depicting a relationship between an allowable upper limit value of a relative speed and a distance (clearance) with respect to a object in the vehicle control system 100 according to an embodiment of the present invention. As depicted in FIG. 2, when the vehicle 1 travels at a certain absolute speed, the allowable upper limit value $V_{lim}$ which is set with respect to the object is 0 (zero) km/h under a condition that the distance X with respect to the object is equal or less than $D_0$ (safe distance), and is quadratically increased under a condition that the distance X is equal to or greater than $D_0$ ($V_{lim}=k(X-D_0)^2$, where $X \geq D_0$). That is, in order to ensure safety, the relative speed of the vehicle 1 is set to zero under the condition that the distance X is equal or less than $D_0$. On the other hand, under the condition that the distance X is equal to or greater than $D_0$, the vehicle 1 is allowed to travel at a higher relative speed, as the distance becomes larger.

In the example depicted in FIG. 2, the allowable upper limit value with respect to the object is defined as $V_{lim}=f(X)=k\ (X-D_0)^2$. In this formula, k denotes a gain factor related to a rate of change of $V_{lim}$ with respect to X, and is set depending on types of the object, or the like.

In this embodiment, $V_{lim}$ is defined as including the safe distance and to be a quadratic function of X. Alternatively, $V_{lim}$ may be defined without including the safety distance and by another function (e.g., a linear function). Further, although the allowable upper limit value $V_{lim}$ has been described with reference to FIG. 2 and with regard to the lateral direction with respect to the object, it may be set in all radial directions including the longitudinal direction with respect to the object, in the same manner as described above. In this case, the factor k and the safety distance $D_0$ may be set according to the direction from the object to the vehicle.

Considering the allowable upper limit value $V_{lim}$ as described above, in the present embodiment, the vehicle control system of the vehicle 1 is configured to set, with respect to an object (e.g., a preceding vehicle, a parked vehicle, a pedestrian, a guard rail, or the like) detected by the vehicle 1, a two-dimensional distribution (speed distribution area 40) defining an allowable upper limit value of a relative speed of the vehicle 1 with respect to the object in the traveling direction, around the object (over a lateral region, a rearward region, and a forward spatial region with respect to the object).

Figure 3:
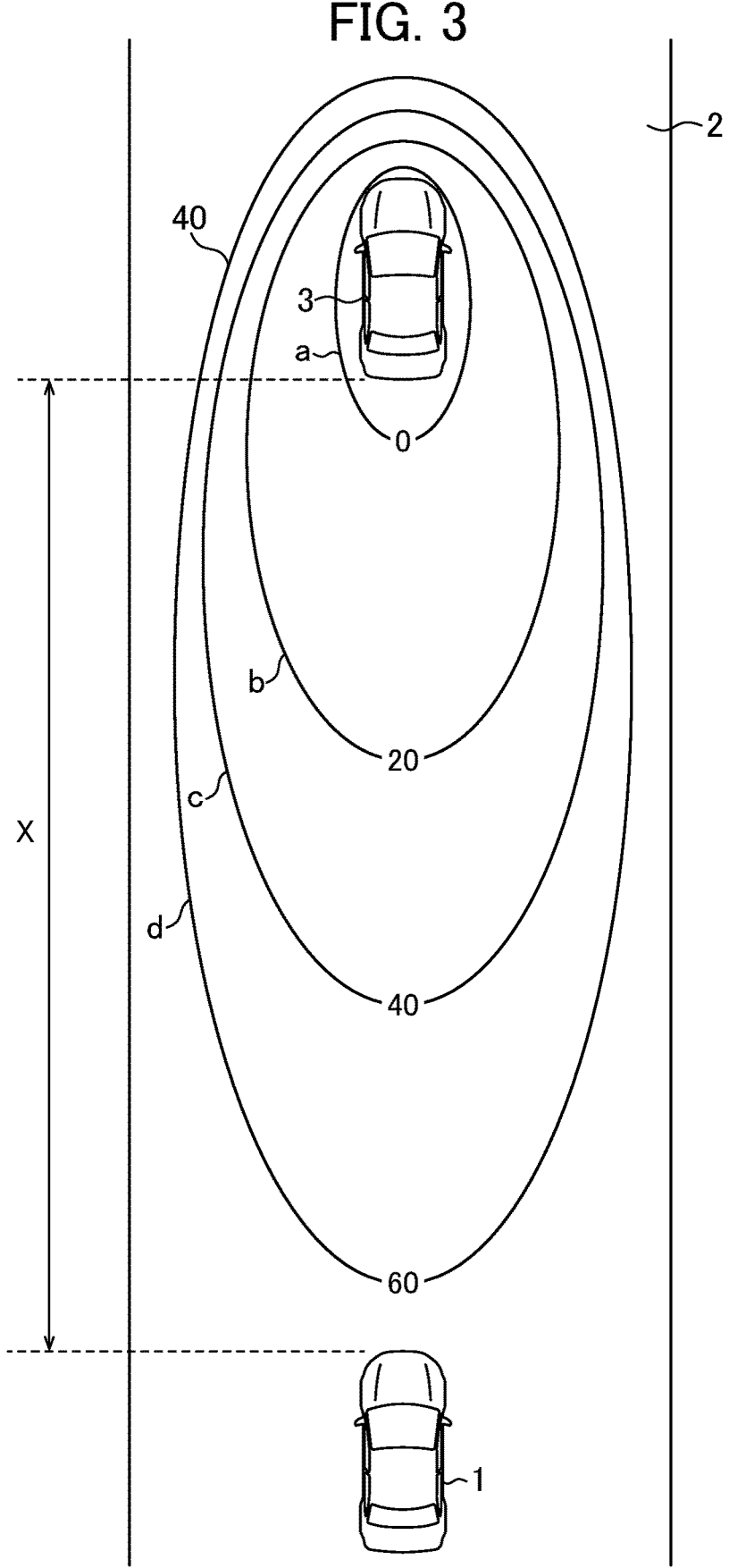
FIG. 3 is an explanatory diagram of a speed distribution area which is set with respect to a preceding vehicle during normal traveling, in the vehicle control system according to this embodiment.

FIG. 3 is an explanatory diagram of a speed distribution area which is set with respect to a preceding vehicle during normal traveling, in the vehicle control system according to this embodiment. As depicted in FIG. 3, in the speed distribution area 40, the allowable upper limit value $V_{lim}$ of the relative speed is set at each point around the preceding vehicle 3. During operation of the driving assistance system, the relative speed of the vehicle 1 with respect to the preceding vehicle 3 is limited by the allowable upper limit value $V_{lim}$ in the speed distribution area 40.

The speed distribution area 40 is set such that the allowable upper limit value of the relative speed becomes smaller as each of the lateral distance and the longitudinal distance from the preceding vehicle 3 become smaller (the vehicle 1 comes closer to the preceding vehicle 3). In FIG. 3, for the sake of facilitating understanding, a plurality of constant relative speed lines are drawn by connecting points each having the same allowable upper limit value. The constant allowable upper limit values $V_{lim}$ represented as the relative speed lines a, b, c, d are, respectively, 0 km/h, 20 km/h, 40 km/h, and 60 km/h.

In FIG. 3, the allowable upper limit value in the speed distribution area 40 is set up to 60 km/h. Alternatively, in consideration of passing by the oncoming vehicle traveling in the opposite lane, the allowable upper limit value in the speed distribution area 40 may be set up to a higher relative speed.

Here, the speed distribution area 40 can be set based on various parameters. As parameters, for example, the relative speed of the vehicle 1 with respect to the object, types of the object, the traveling direction of the vehicle 1, the moving direction and the moving speed of the object, the length of the object, the absolute speed of the vehicle 1 or the like can be taken into account. The factor k and the safe distance $D_0$ can be selected based on these parameters.

As above, the speed distribution area 40 can be set with respect to various objects. For example, the object includes a vehicle, a pedestrian, a bicycle, a roadway section, an obstacle, a traffic signal, a traffic sign, or the like. As for the vehicle, a motor vehicle, a truck and a motorcycle can be distinguished. As for the pedestrian, an adult, a child, a group can be distinguished. The roadway section includes a guard rail, a shoulder forming a step at the end of the traveling road, a median strip, and a lane boundary. The obstacle includes a cliff, a groove, a hole, and a fallen object. The traffic sign includes a halt line and stop sign.

In the present embodiment, the vehicle control system of the vehicle 1 is configured such that the driver can select a desired driving assistance mode by using an input device (not depicted). Alternatively, a given mode may be preset in the ECU 10. For example, the mode includes a straight traveling priority mode (or shortest distance priority mode) which is a mode setting for giving priority to traveling at the shortest distance, an automatic steering mode which is a mode setting for automatically controlling the engine, the brake and the steering depending on the vehicle speed and the traveling course, a speed priority mode which is a mode setting for suppressing a decrease in the vehicle speed, and an automatic following mode which is a mode setting in which a preceding vehicle traveling ahead of the vehicle is set as a followed vehicle to be followed by the vehicle and the vehicle travels while keeping a given distance and a given vehicle speed with respect to the followed vehicle, and the like.

Also in the present embodiment, the ECU 10 is configured, when the automatic following mode is selected while a vehicle 1 is traveling in one of the plurality of lanes, to perform an avoidance control according to the movement of the followed vehicle and the traveling state of the lanes (traveling lane and adjacent lane). More specifically, when there is a stopped vehicle in the traveling lane and the followed vehicle changes the lane to avoid the stopped vehicle, ECU 10 is configured to, based on the speed distribution area which is set with respect to the stopped vehicle and the traveling state of the vehicle in the adjacent lane, execute an avoidance control of avoiding a collision with the stopped vehicle 3 such as changing the lane while following the followed vehicle, deceleration in the traveling lane, or the like.

Figure 4:
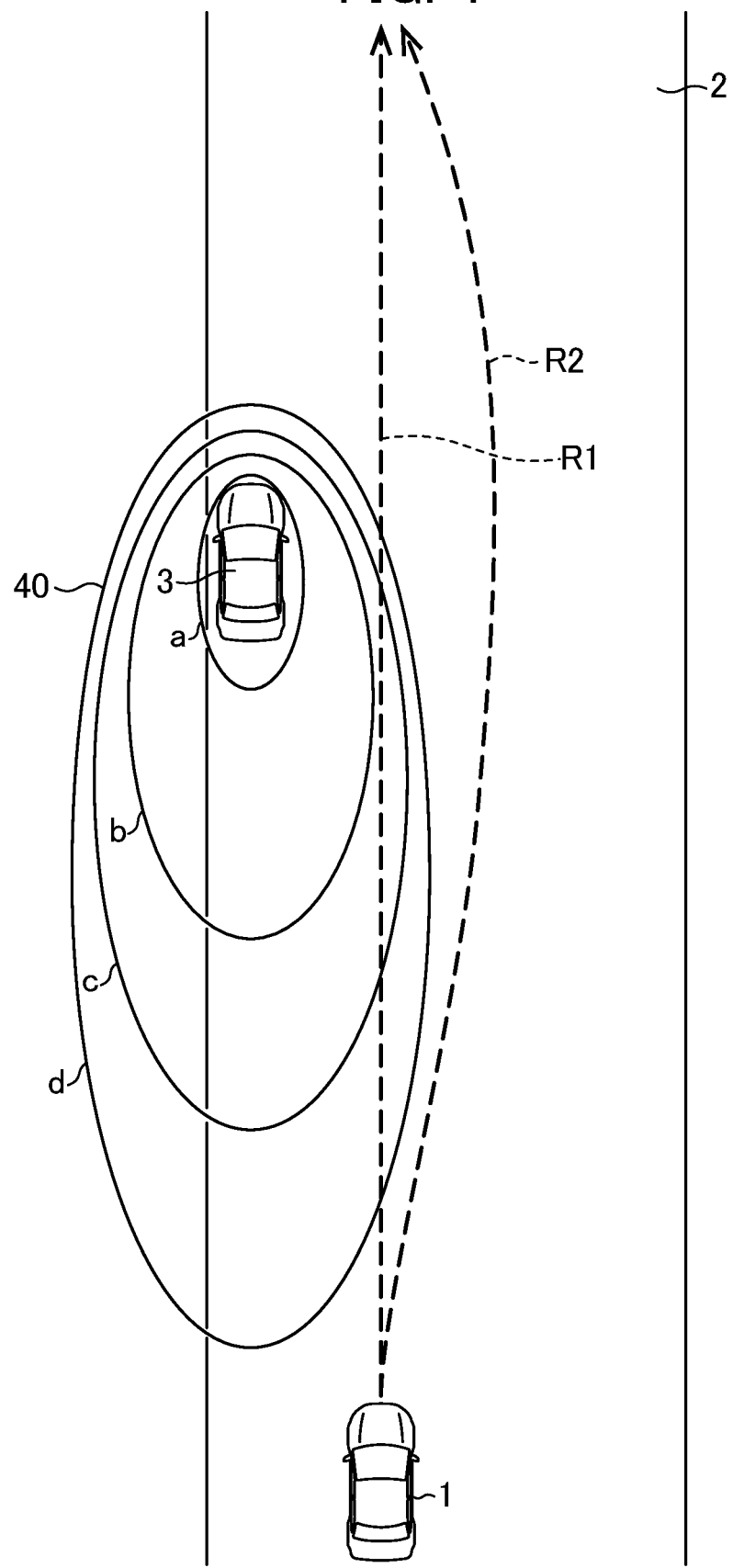
FIG. 4 is an explanatory diagram of operation of the vehicle control system according to this embodiment, during the normal traveling.
Figure 5:
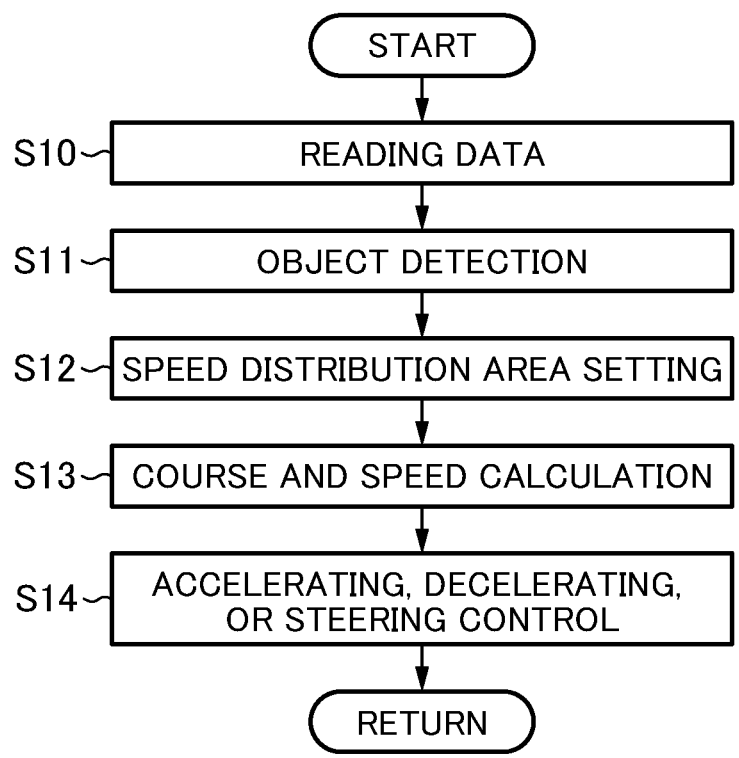
FIG. 5 is a flow chart depicting processing of the vehicle control device according to this embodiment, during the normal traveling.

Next, with reference to FIGS. 4 and 5, a flow of processing during normal traveling in the vehicle control system according to the present embodiment will be now described.

FIG. 4 is an explanatory diagram of an operation during normal traveling in the vehicle control system 100, and FIG. 5 is a flow chart depicting processing of the vehicle control device during normal traveling.

As depicted in FIGS. 4 and 5, when the vehicle 1 is traveling in the traveling road, the ECU 10 (data acquisition section 10a) of the vehicle 1 acquires various data from a plurality of sensors (S10). Specifically, the ECU 10 operates to receive: image data from the vehicle-mounted camera 21 taking images of a forward side of the vehicle 1; and measurement data from the millimeter-wave radar 22.

The ECU 10 (object detection section 10b) operates to process data acquired from an external sensor including at least the vehicle-mounted camera 21 to detect the object (S11). Specifically, the ECU 10 operates to execute image processing of the image data to detect the parked vehicle 3 as an object. In this process, a type of the object (in this case, the vehicle 3) is identified. Further, the ECU 10 can operate to detect the presence of a specific obstacle from the map information.

Further, the ECU 10 (position and relative speed calculating section 10c) operates to calculate, based on the measurement data, a position and relative speed of the detected object (parked vehicle 3) with respect to the vehicle 1. It should be noted that the position of the object includes the y-direction position (longitudinal distance) along the traveling direction of the vehicle 1 and the x direction position (lateral distance) along the lateral direction orthogonal to the traveling direction. As the relative speed, the relative speed included in the measurement data may be used as it is, or alternatively a speed component along the traveling direction which is calculated from the measurement data may be used. Here, a speed component orthogonal to the traveling direction is not necessarily calculated, but it may be estimated from a plurality of measurement data and/or a plurality of image data, if necessary.

The ECU 10 (speed distribution area setting section 10d) operates to set a speed distribution area 40 with respect to the detected object (that is, the vehicle 3) (S12). Then, on the basis of the set speed distribution area 40, the ECU 10 (course calculating section 10e) operates to calculate the travelable course of the vehicle 1 and the set vehicle speed or the target speed at each position on the course according to the preset mode (S13).

For traveling on the calculated course by the vehicle 1, the ECU 10 (avoidance control execution section 10f) operates to execute an avoidance control as described below according to the preset mode (S14). Here, the flow chart of FIG. 5 is repeatedly executed every a given time (for example, 0.1 second), so that the calculated course and the set speed on this course vary with time.

Here, in FIG. 4, the case where the calculated course is the courses R1, R2 will be described.

The course R1 is a direct (straight-ahead) course. The course R1 is calculated when the straight traveling priority mode (or shortest distance priority mode) is set. The course R1 is set to cut across the constant relative speed lines d, c, c, and d of the speed distribution area 40. Therefore, when the vehicle 1 travels on the course R1, the allowable upper limit value of the relative speed in the traveling direction changes on the course R1. Specifically, the allowable upper limit value decreases once, and then increases (speed distribution area 40).

For example, when the vehicle 1 enters the course R1 at a relative speed of 60 km/h and even when the driver maintains the amount of depression of the accelerator pedal constant, within an area inside the constant relative speed line d (corresponding to 60 km/h), the speed of the vehicle 1 is automatically controlled by the avoidance control. That is, unless the driver reduce the amount of depression of the accelerator pedal such that a relative speed of the vehicle 1 is reduced to a value equal to or lower than the allowable upper limit value, the relative speed of the vehicle 1 is maintained at an allowable upper limit value at each point. Moreover, when the vehicle 1 enters the course R1 at a relative speed of 40 km/h, for example, unless the amount of depression of the accelerator pedal is reduced, the relative speed is maintained at 40 km/h (not accelerated or decelerated) until the vehicle 1 enters into an area inside the constant relative speed line c (corresponding to 40 km/h).

In the above case, when the automatic steering mode is selected in addition to the straight travel priority mode, the vehicle 1 is gradually decelerated as it approaches the parked vehicle 3, and then accelerated to the set speed. In order to execute such avoidance control, the ECU 10 operates to perform acceleration/deceleration control by outputting an engine output change request signal and a brake request signal to the engine control system 31 and the brake control system 32, respectively.

On the other hand, the course R2 is set to pass outside the constant relative speed line d in the speed distribution area 40. The course R2 is calculated when the speed priority mode is set, which is the mode setting for suppressing the reduction of the vehicle speed. In the case of this embodiment, the allowable upper limit value on the course R2 is at least greater than the relative speed of 60 km/h, so that when the pathway is changed due to the steering of the steering wheel by the driver and the vehicle 1 enters the course R2 at 60 km/h (absolute speed), the vehicle 1 travels on the course R2 at the vehicle speed corresponding to the amount of depression of the accelerator pedal by the driver. Thus, the ECU 10 does not operate to output the engine output change request signal and the brake request signal, therefore the vehicle 1 travels at the vehicle speed corresponding to the amount of depression of the accelerator pedal.

In the above case, when the automatic steering mode is selected in addition to the speed priority mode, the ECU 10 operates to output a steering direction change request signal to the steering control system 33. As a result, the vehicle 1 travels on the course R2. In this process, the vehicle 1 travels at the vehicle speed corresponding to the amount of depression of the accelerator pedal, thus the ECU 10 does not operates to output the engine output change request signal and the brake request signal.

Here, the course R2 is calculated when the relative speed of the vehicle 1 is 60 km/h, thus is a course along the outside of the constant relative speed line d of the speed distribution area 40 (corresponding to 60 km/h). However, when the relative speed of the vehicle 1 is 40 km/h for example, another course along the outside of the constant relative speed line c (corresponding to 40 km/h) of the speed distribution area 40 is calculated.

Figure 6:
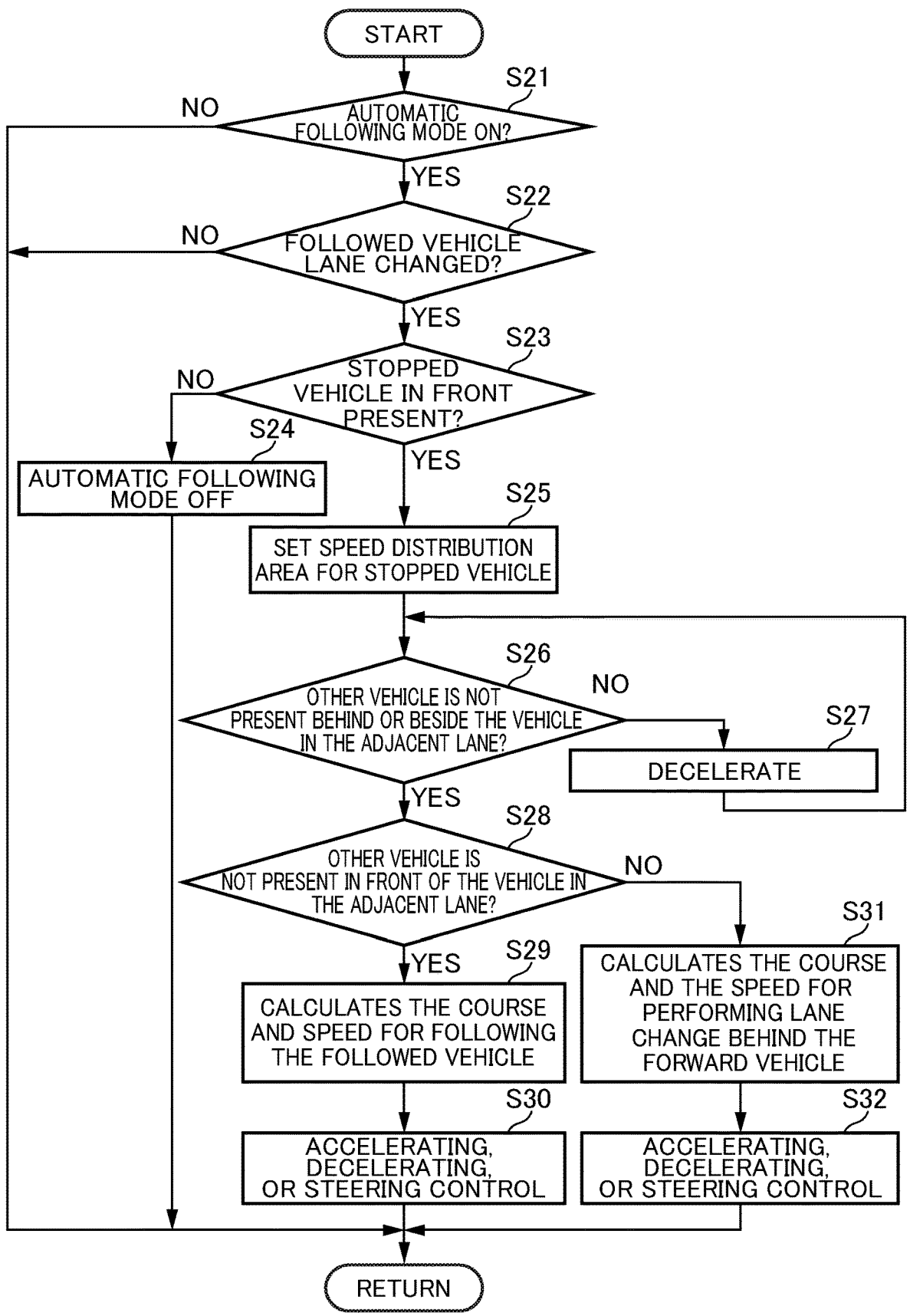
FIG. 6 is a flow chart depicting processing of the vehicle control device according to this embodiment, during an automatic following mode.

Next, with reference to FIGS. 6 to 10, a flow of processing of the vehicle control system according to the present embodiment when the automatic following mode is selected will be described. FIG. 6 is a flow chart of the vehicle control device during an automatic following mode according to the present embodiment, and FIGS. 7 to 10 are an explanatory diagram of an operation of the vehicle control system during an automatic following mode according to the present embodiment.

In the embodiments depicted in FIGS. 6 to 10, the traveling road 2 has a plurality of lanes, that is, a traveling lane 7 in which the vehicle 1 travels and an adjacent lane 8 adjacent to the traveling lane 7, and a following control mode in which the vehicle 1 automatically follows the preceding vehicle as a followed vehicle 4 is selected. In this situation, the case where there is a stopped vehicle 3 ahead of the followed vehicle 4 in the traveling lane 7 and the followed vehicle 4 makes a lane change from the traveling lane 7 to an adjacent lane 8 will be described below.

Further, as with the flow chart of FIG. 5, the flow chart of FIG. 6 is also repeatedly executed every a given time (for example, 0.1 second), so that the calculated course and the set speed on this course vary with time.

As depicted in FIG. 6, when the driver selects the automatic following mode using an input device (not depicted) (S21), in step S22, the ECU 10 determines whether or not the followed vehicle 4 executes the lane change from a traveling lane 7 to the adjacent lane 8. If the followed vehicle 4 executes the lane change to the adjacent lane 8, then the ECU 10 detects whether or not there is a stopped vehicle 3 ahead of the vehicle 1 in the traveling lane 7 of the vehicle 1 (S23). If there is not the stopped vehicle 3 in front, the ECU 10 determines that the vehicle 1 is possible to travel in the traveling lane 7, turns off the automatic following mode, releases the following control on the followed vehicle 4, and maintains travelling in the traveling lane 7 (S24).

Figure 7:
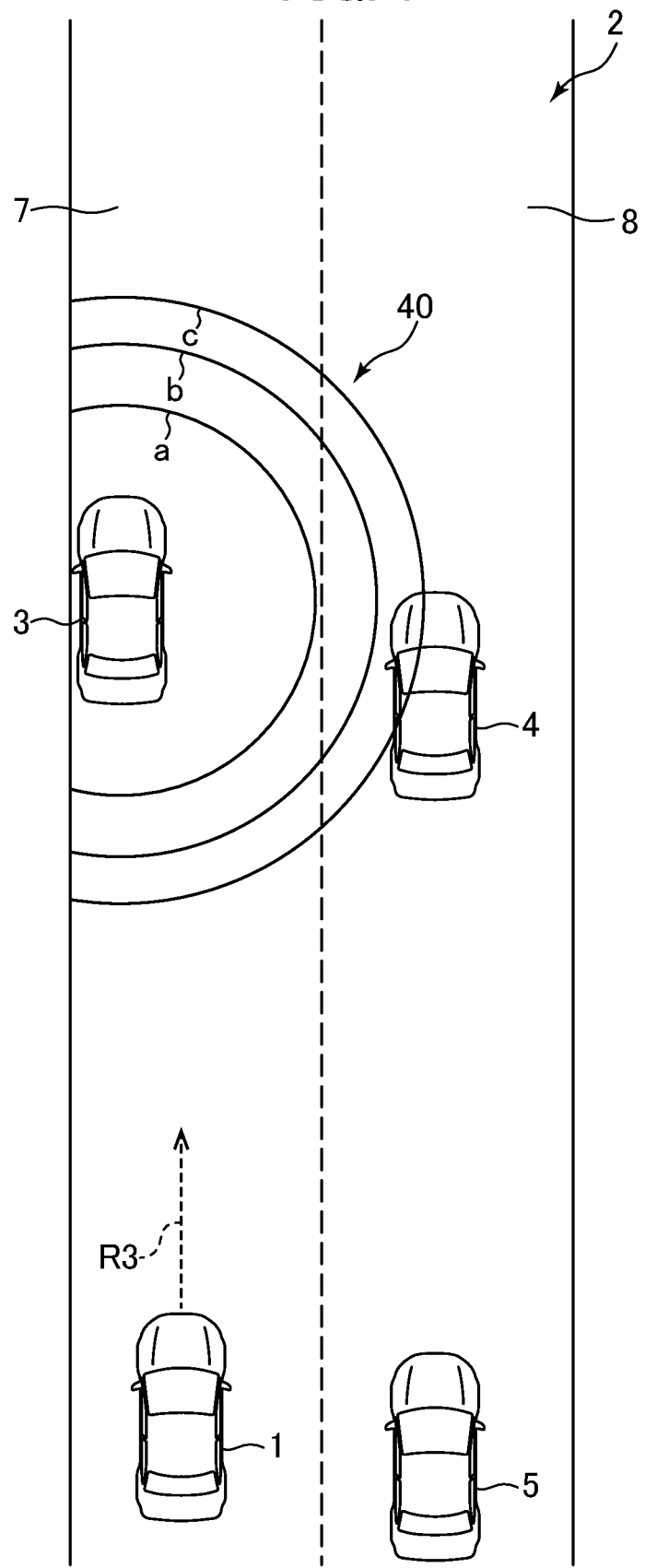
FIG. 7 is an explanatory diagram depicting one example of operation of the vehicle control device according to this embodiment, during the automatic following mode.

On the other hand, in Step S23, if there is the stopped vehicle 3 ahead of the vehicle 1 in the traveling lane 7, the ECU 10 sets a speed distribution area 40 with respect to the stopped vehicle 3 (S25). The speed distribution area 40 can assume, for example, a distribution as shown in FIG. 7, in FIG. 7, for example, the constant relative speed lines a, b, and c correspond to 0 km/h, 10 km/h, 20 km/h, respectively.

Then the ECU 10 detects whether or not there is a vehicle traveling behind or beside (rearward or lateral) the vehicle 1 in the adjacent lane 8 (S26). As depicted in FIG. 7, if there is the vehicle 5 behind or beside the vehicle 1, the ECU 10 determines that the vehicle 1 cannot execute the lane change to the adjacent lane 8 while following the followed vehicle 4, and operates to turn off the automatic following mode to cancel the following control of the followed vehicle 4, control the speed according to the speed distribution area 40 with respect to the stopped vehicle 3 and decelerate the vehicle 1 (S27). In this case, the course through which the vehicle 1 passes is in the traveling lane 7 as denoted by the course R3 in FIG. 7.

Figure 8:
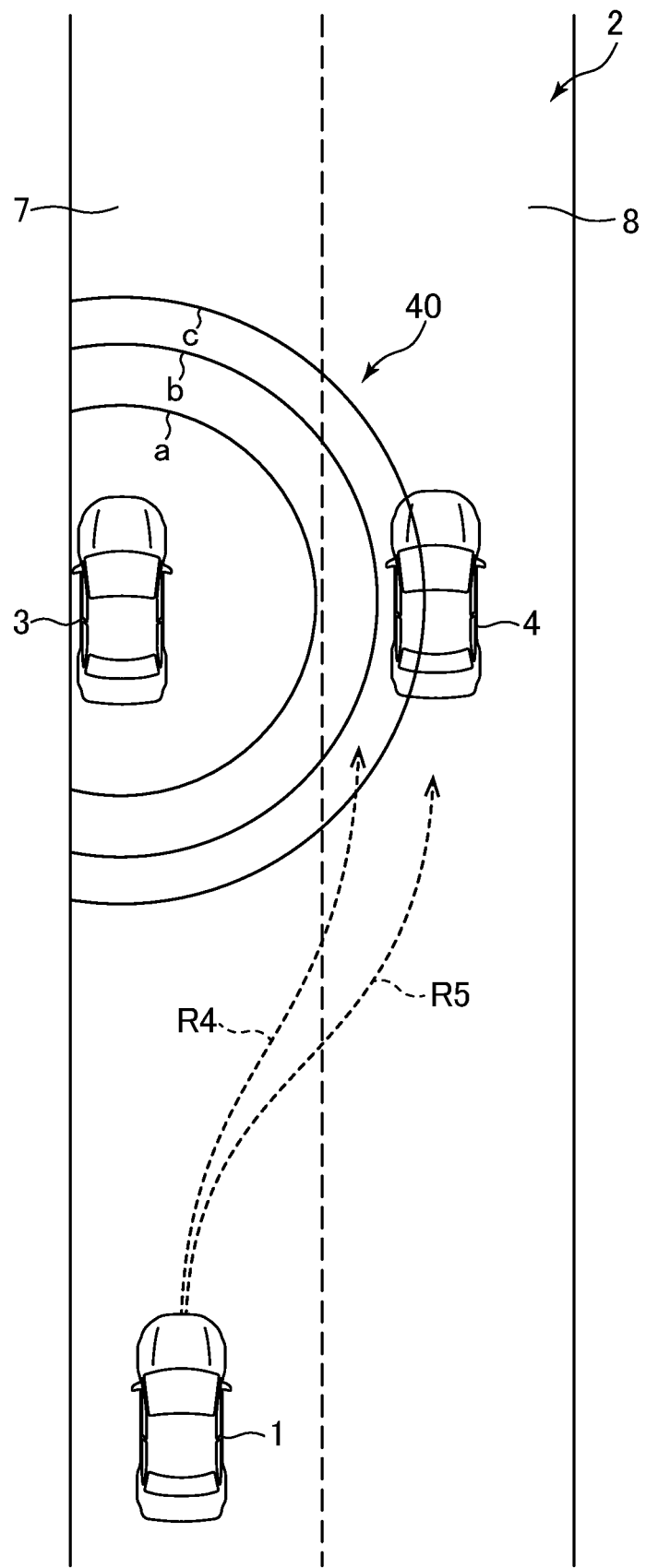
FIG. 8 is an explanatory diagram depicting another example of the operation of the vehicle control device during an automatic following mode according to this embodiment.

In step S26, if there is no vehicle in the adjacent lane 8 behind or beside the vehicle 1, the ECU 10 detects whether or not there is a vehicle ahead of the vehicle 1 in the adjacent lane 8 (S28). If there is no vehicle ahead of the vehicle 1 in the adjacent lane 8, as depicted in FIG. 8, then there is no vehicle travelling in the adjacent lane 8 either ahead of the vehicle 1 or behind or beside the vehicle 1, thus the ECU 10 determines that the vehicle 1 can execute the lane change to the adjacent lane 8 while following the followed vehicle 4, and operate to calculate the course and speed for following the followed vehicle 4 (S29).

Here, the case where the calculated course is the courses R4, R5 will be described.

The course R4 is set to pass at the left end of the adjacent lane 8. The course R4 passes inside the constant relative speed line c of the stopped vehicle 3. Thus, for example, when the vehicle 1 is traveling at 30 km/h, it is necessary to decelerate the vehicle 1 inside the constant relative speed line c, and the longitudinal deceleration is relatively high. Whereas, the course R4 is set to pass through the left end of the adjacent lane 8, thus the lateral distance for which the vehicle 1 travels is relatively small, so that the lateral acceleration is relatively small.

On the other hand, the course R5 is set to pass through a right side (the center-side) of the adjacent lane 8 than the course R4. Course R5 passes through the area outside the speed distribution area 3 of the stopped vehicle 3, thus it is not necessary to decelerate the vehicle 1. Therefore, acceleration or deceleration in the longitudinal direction is not necessary or minimized Whereas, the course R5 needs to move largely in the lateral direction (right direction), so that the lateral acceleration becomes relatively large.

As described above, the driving feeling received by the driver depends on the selected course. Thus the ECU 10 operates to select the course which the driver is unlikely to feel discomfort among the selectable courses. As an example, the course which can travel at a speed closest to the current traveling speed of the vehicle 1 may be selected.

After calculating the course and the speed, the ECU 10 operates to perform acceleration/deceleration control such that the vehicle 1 travels at the calculated speed by outputting an engine output change request signal and a brake request signal to the engine control system 31 and the brake control system 32, respectively. Further, the ECU 10 operates to output a steering direction change request signal to the steering control system 33, so that the vehicle 1 travels on the calculated course (S30).

As the result of such control, the vehicle 1 makes a lane change to the adjacent lane 8 behind the followed vehicle 4 and continues the automatic following of the followed vehicle 4.

Figure 9:
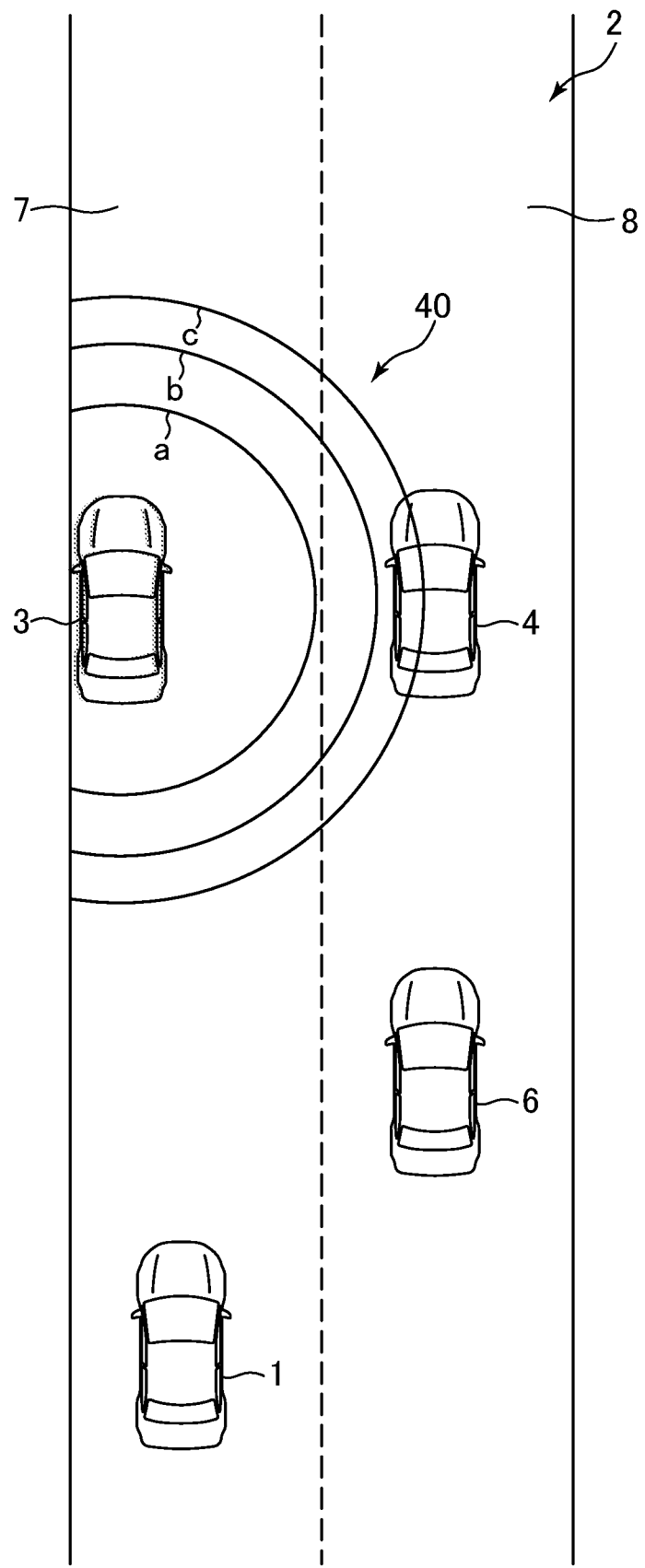
FIG. 9 is an explanatory diagram depicting yet another example of the operation of the vehicle control device according to this embodiment, during the automatic following mode.

In Step 28, if there is a vehicle (forward vehicle) 6 ahead of the vehicle 1 in the adjacent lane 8, as depicted in FIG. 9, it is difficult for the vehicle 1 to make a lane change to the adjacent lane 8 between the followed vehicle 4 and the forward vehicle 6. In this situation, the ECU 10 calculates the course and the speed for executing a lane change to the adjacent lane 8 behind the forward vehicle 6 (S31).

Figure 10:
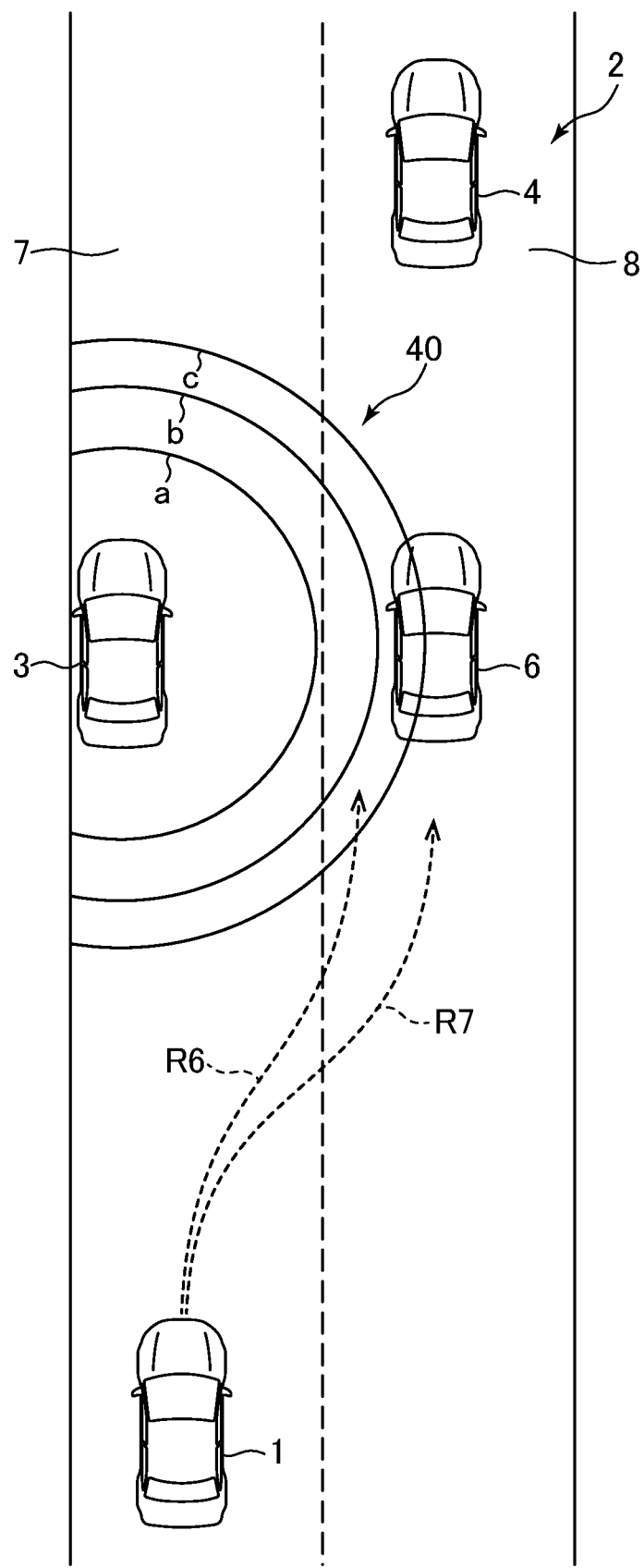
FIG. 10 is an explanatory diagram depicting still another example of the operation of the vehicle control device according to this embodiment during the automatic following mode.

Here, the case where the calculated course is the courses R6, R7 as depicted in FIG. 10 will be described.

The course R6 is set to pass at the left end of the adjacent lane 8 similarly to the course R4. Therefore, the longitudinal deceleration is relatively high, but the lateral acceleration is relatively small.

Whereas, in the course R7, acceleration or deceleration in the longitudinal direction is not necessary or minimized, but the lateral acceleration becomes relatively large as with the course R5. The ECU 10 operates to select the course which the driver is unlikely to feel discomfort among the selectable courses. As an example, the course which can travel at a speed closest to the current traveling speed of the vehicle 1 may be selected.

After calculating the course and the speed, the ECU 10 operates to perform acceleration/deceleration control such that the vehicle 1 travels at the calculated speed by outputting an engine output change request signal and a brake request signal to the engine control system 31 and the brake control system 32, respectively. Further, the ECU 10 operates to output a steering direction change request signal to the steering control system 33, so that the vehicle 1 travels on the calculated course (S32). In this process, the ECU 10 operates to turn off the automatic following mode. Moreover, when the vehicle 1 makes the lane change while traveling on the calculated course, the pathway may be changed by steering of the steering wheel by the driver. In this situation, the ECU 10 operates to control the upper limit value of the speed of the vehicle 1 by outputting the engine output change request signal and/or the brake request signal to the engine control system 31 and the brake control system 32, respectively, according to the speed distribution area with respect to the stopped vehicle 3.

As a result of such control, the vehicle 1 cancels the automatic following of the followed vehicle 4, makes the lane change to the adjacent lane 8 behind the forward vehicle 6, and travels in the adjacent lane 8.

Next, an operation of the vehicle control device (ECU) 10 according to the present embodiment will be described.

In the present embodiments, the ECU 10 is configured to detect a stopped vehicle 3 ahead of the vehicle 1 in a traveling lane; set a speed distribution area 40 with respect to the stopped vehicle 3; detect a traveling state of a vehicle traveling in an adjacent lane 8 to the vehicle 1; and based on the traveling state of the vehicle traveling in an adjacent lane and the speed distribution area 40 with respect to the stopped vehicle 3, execute an avoidance control of avoiding a collision with the stopped vehicle 3. Thus, for example, the avoidance control is executed in such a manner as to, when it is impossible to make a lane change, maintain the traveling lane 7 while keeping a safe distance and vehicle speed with respect to the stopped vehicle 3, or to, when it is possible to make a lane change, determine a course according to the speed distribution area 40 with respect to the stopped vehicle 3 and change the traveling lane to the adjacent lane. Thus, it becomes possible to execute the avoidance control while keeping the safe distance and vehicle speed with respect to the stopped vehicle 3, to provide safe driving assistance by simple and efficient vehicle speed control.

In the present embodiment, if the automatic following mode is selected for the vehicle 1, when the followed vehicle 4 makes a lane change to the adjacent lane 8, the ECU 10 is configured to perform the detection of the stopped vehicle 3, the setting of the speed distribution area 40, the detection of the traveling state of the vehicle in the adjacent lane 8, or the like, so as to execute the avoidance control according to results of the detection. When the followed vehicle 4 makes a lane change to the adjacent lane 8, there is a possibility that the stopped vehicle 3 exists ahead of the traveling lane 7. Therefore, in this situation, it is possible to perform the detection of the stopped vehicle 3 or the like, and, based on results of the detections, execute the avoidance control, to provide a safe driving assistance system reliably and efficiently.

In the present embodiment, the ECU 10 detects the presence or absence of a rearward/lateral vehicle 5 traveling behind or beside the vehicle 1 in the adjacent lane 8, and when there is a rearward/lateral vehicle 5, the vehicle 1 changes the vehicle speed based on the speed distribution area 40 with respect to the stopped vehicle 3 while maintaining the traveling lane 7. When there is a rearward/lateral vehicle 6 in the adjacent lane 8, it is difficult for the vehicle 1 to make a lane change to the adjacent lane 8. Therefore, in this situation, the ECU 10 is operable to, when approaching the stopped vehicle 3, perform deceleration control while maintaining the traveling lane 7. This makes it possible to enable the vehicle 1 to travel while keeping a safe distance and vehicle speed with respect to the stopped vehicle 3, and avoiding an unreasonable lane change.

In the present embodiment, when there is neither a rearward/lateral vehicle 5 nor a forward vehicle 6 in the adjacent lane 8, as the avoidance control, the ECU 10 operates to change the traveling lane of the vehicle 1 from the traveling lane 7 to the adjacent lane 8 based on the speed distribution area 40 with respect to the stopped vehicle 3. When there is neither a rearward/lateral vehicle 5 nor the forward vehicle 6 in the adjacent lane 8, a space for allowing the vehicle 1 to make a lane change is ensured, thus it is possible to make a lane change safely. Furthermore, the lane change is made based on the speed distribution area 40 with respect to the stopped vehicle 3, so that it is possible to make the vehicle 1 to change a lane while keeping a safe distance and vehicle speed with respect to the stopped vehicle 3.

In the present embodiment, when there is not a rearward/lateral vehicle 5 but there is a forward vehicle 6 in the adjacent lane 8, as the avoidance control, the ECU 10 operates to change the traveling lane of the vehicle 1 from the traveling lane 7 to the adjacent lane 8 behind the forward vehicle 6 based on the speed distribution area 40 with respect to the stopped vehicle 3. When there is not a rearward/lateral vehicle 5 but there is a forward vehicle 6 in the adjacent lane 8, it is difficult for the vehicle 1 to make a lane change at a position forward of the forward vehicle 6, but a space for the lane change is ensured behind the forward vehicle 6. Thus, the ECU 10 operates to control the vehicle 1 to make a lane change behind the forward vehicle 6, thereby the vehicle 1 can make a lane change safely. The lane change is made based on the speed distribution area 40 with respect to the stopped vehicle 3, so that it is possible to cause the vehicle 1 to make a lane change while keeping a safe distance and vehicle speed with respect to the stopped vehicle 3.

In the present embodiment, the avoidance control (S14) is configured to change the vehicle speed and/or the steering direction of the vehicle 1 such that the relative speed of the vehicle 1 in the speed distribution area 40 does not exceed the allowable upper limit value. In order to do this, for example, the avoidance control may be configured to change (reduce) the vehicle speed itself of vehicle 1 as denoted by the course R1 in FIG. 4, or may be configured to change the steering direction to change a traveling course so as to enable the vehicle 1 to pass through an area having larger allowable upper limit value as denoted by the course R2.

In the present embodiment, the avoidance control is configured to calculate a course of the vehicle 1 based on the speed distribution area 40, thus it is possible for the vehicle 1 to travel on a safe course, in relation to the stopped vehicle 3.

In the present embodiment, the speed distribution area 40 is set such that the allowable upper limit value becomes lower as the lateral distance from the stopped vehicle 3 becomes smaller, so that, when the vehicle 1 passes by the stopped vehicle 3 at a position away from the stopped vehicle 3, the relative speed is allowed to be a relatively large value, whereas, when the vehicle 1 passes by the stopped vehicle 3 at a position close to the stopped vehicle 3, the relative speed is limited to a relatively small value. That is, in the present invention, the allowable upper limit value of the relative speed of the vehicle 1 is controlled according to the distance from the stopped vehicle 3. This makes it possible to provide a safe driving assistance by simple and efficient vehicle speed control.

In the present embodiment, the speed distribution area 40 is further set in the range from a lateral region to a rearward region with respect to the stopped vehicle 3, such that the allowable upper limit value becomes lower as each of a lateral distance and a longitudinal distance from the stopped vehicle 3 becomes smaller. Therefore, even when the vehicle 1 is traveling behind or obliquely behind the stopped vehicle 3, the allowable upper limit value of the relative speed is set by extensionally applying the above control rule for a case when passing by the stopped vehicle 3. Thus, in the present embodiment, it becomes possible to maintain a safe relative speed by simple and efficient control, even when the vehicle 1 is traveling behind or obliquely behind the stopped vehicle 3.

In the present embodiment, the speed distribution area 40 is set such that the allowable upper limit value becomes zero at a position away from the stopped vehicle 3 by a given safe distance, resulting in prohibiting the vehicle 1 to approach the stopped vehicle 3 closer to a position away from the stopped vehicle 3 by a safe distance. Therefore, in the present invention, it becomes possible to prevent a collision between the vehicle 1 and the stopped vehicle 3, even when the stopped vehicle 3 moves in a direction causing it to approach the vehicle 1, such as when the stopped vehicle 3 is suddenly started.

The present invention is not limited to the above embodiments, and may be, for example, the aspects as below.

In the flow chart depicted in FIGS. 7 to 10 described above, although it is not mentioned to set the speed distribution area with respect to vehicles other than the stopped vehicle 3, for example, the followed vehicle 4, the rearward/lateral vehicle 5, and/or the forward vehicle 6, the speed distribution area may be set with respect to at least one of these vehicles. In this case, the course of the vehicle 1 is calculated by taking account the speed distribution area set with respect to the stopped vehicle 3 and the speed distribution area set with respect to the other vehicles.

Further, in the examples of FIGS. 7 to 10, the traveling road 2 has two lanes of a traveling lane 7 and an adjacent lane 8, but the present invention is not limited to this, the number of lanes on the traveling road can be arbitrarily set, thus two or more adjacent lanes may be provided. Even in this situation, it is possible to perform a safe avoidance control by applying the above-mentioned control rule.

Moreover, the speed distribution area 40 is set such that the allowable upper limit value of the relative speed becomes smaller as the lateral distance and the longitudinal distance from the stopped vehicle 3 become smaller. However the present invention is not limited to this, any distribution can be adopted.

LIST OF REFERENCE SIGNS

1: vehicle
2: traveling road
3: stopped vehicle
4: followed vehicle
5: rearward/lateral vehicle
6: forward vehicle
7: traveling lane
8: adjacent lane
10: ECU (vehicle control device)
21: vehicle-mounted camera
22: millimeter-wave radar
23: vehicle speed sensor
24: positioning system
25: navigation system
31: engine control system
32: brake control system
33: steering control system
40: speed distribution area
100: vehicle control system
a, b, c, d: constant relative speed line
D0: safe distance
X: distance
R1 to R7: course

The invention claimed is:

1. A vehicle control system used for a vehicle, the system having a processor comprising:
an object detection section for detecting a stopped vehicle ahead of the vehicle in a traveling lane of the vehicle;
a speed distribution area setting section for setting a speed distribution area which defines a distribution of an allowable upper limit value of a relative speed of the vehicle around the stopped vehicle;
a traveling state detection section for detecting a traveling state of a third vehicle which is traveling in an adjacent lane of the vehicle; and
an avoidance control execution section for executing an avoidance control to avoid a collision with the stopped vehicle by determining a course of the vehicle before entering the speed distribution area based on the traveling state of the third vehicle in the adjacent lane and the speed distribution area around the stopped vehicle,
wherein a portion of the speed distribution area is also set on the adjacent lane; and
wherein the allowable upper limit value which is set with respect to the stopped vehicle is zero km/h under a condition that the distance with respect to the stopped vehicle is equal or less than a safe distance, and is quadratically increased under a condition that the distance is equal to or greater than the safe distance.

2. The vehicle control system as recited in claim 1, which is further configured to: control the vehicle to follow a preceding vehicle traveling ahead of the vehicle;
and, when the preceding vehicle changes a lane to the adjacent lane, perform the detection of the stopped vehicle, the setting of the speed distribution area, the detection of the traveling state of the third vehicle in the adjacent lane, and the execution of the avoidance control.

3. The vehicle control system as recited in claim 1, wherein the traveling state of the third vehicle in the adjacent lane includes a presence or absence of a rearward/lateral vehicle traveling behind or beside the third vehicle in the adjacent lane, and wherein the avoidance control is configured to, when there is a rearward/lateral vehicle, change a vehicle speed of the vehicle based on the speed distribution area while maintaining the traveling lane of the vehicle.

4. The vehicle control system as recited in claim 1, wherein the traveling state of the third vehicle in the adjacent lane includes a presence or absence of a rearward/lateral vehicle traveling behind or beside the third vehicle in the adjacent lane, and a presence or absence of a forward vehicle traveling ahead of the third vehicle in the adjacent lane, and wherein the avoidance control is configured to, when there is neither a rearward/lateral vehicle nor the forward vehicle, change the traveling lane of the vehicle to the adjacent lane based on the speed distribution area.

5. The vehicle control system as recited in claim 1, wherein the traveling state of the third vehicle in the adjacent lane includes a presence or absence of a rearward/lateral vehicle traveling behind or beside the third vehicle in the adjacent lane, and a presence or absence of a forward vehicle traveling ahead of the third vehicle in the adjacent lane, and wherein the avoidance control is configured to, when there is not the rearward/lateral vehicle, but there is the forward vehicle, change the traveling lane of the vehicle to the adjacent lane behind the forward vehicle based on the speed distribution area.

6. The vehicle control system as recited in claim 1, wherein the avoidance control is configured to change the vehicle speed and/or a steering direction of the vehicle such that the relative speed of the vehicle in the speed distribution area does not exceed the allowable upper limit value.

7. The vehicle control system as recited in claim 2, wherein the avoidance control is configured to calculate a course of the vehicle based on the speed distribution area.

8. The vehicle control system as recited in claim 3, wherein the avoidance control is configured to calculate a course of the vehicle based on the speed distribution area.

9. The vehicle control system as recited in claim 4, wherein the avoidance control is configured to calculate a course of the vehicle based on the speed distribution area.

10. The vehicle control system as recited in claim 6, wherein the avoidance control is configured to calculate a course of the vehicle based on the speed distribution area.

11. The vehicle control system as recited in claim 2, wherein the speed distribution area is set such that the allowable upper limit value becomes lower as a lateral distance from the stopped vehicle becomes smaller.

12. The vehicle control system as recited in claim 3, wherein the speed distribution area is set such that the allowable upper limit value becomes lower as a lateral distance from the stopped vehicle becomes smaller.

13. The vehicle control system as recited in claim 4, wherein the speed distribution area is set such that the allowable upper limit value becomes lower as a lateral distance from the stopped vehicle becomes smaller.

14. The vehicle control system as recited in claim 6, wherein the speed distribution area is set such that the allowable upper limit value becomes lower as a lateral distance from the stopped vehicle becomes smaller.

15. The vehicle control system as recited in claim 2, wherein the speed distribution area is set with respect to a range from a lateral region to a rearward region of the stopped vehicle, such that the allowable upper limit value becomes lower as a lateral distance and a longitudinal distance from the stopped vehicle becomes smaller.

16. The vehicle control system as recited in claim 3, wherein the speed distribution area is set with respect to a range from a lateral region to a rearward region of the stopped vehicle, such that the allowable upper limit value becomes lower as each of a lateral distance and a longitudinal distance from the stopped vehicle becomes smaller.

17. The vehicle control system as recited in claim 4, wherein the speed distribution area is set with respect to a range from a lateral region to a rearward region of the stopped vehicle, such that the allowable upper limit value becomes lower as each of a lateral distance and a longitudinal distance from the stopped vehicle becomes smaller.

18. The vehicle control system as recited in claim 6, wherein the speed distribution area is set with respect to a range from a lateral region to a rearward region of the stopped vehicle, such that the allowable upper limit value becomes lower as each of a lateral distance and a longitudinal distance from the stopped vehicle becomes smaller.

19. The vehicle control system as recited in claim 2, wherein the speed distribution area is set such that the allowable upper limit value becomes zero at a position away from the stopped vehicle by a given safe distance.

20. The vehicle control system as recited in claim 3, wherein the speed distribution area is set such that the allowable upper limit value becomes zero at a position away from the stopped vehicle by a given safe distance.

21. The vehicle control system as recited in claim 1, wherein the allowable upper limit value under a condition that the distance is equal to or greater than the safe distance is defined as $V_{lim} = f(X) = k(X - D_0)^2$ where $V_{lim}$ denotes the allowable upper limit value, X denotes the distance, $D_0$ denotes the safe distance and k denotes a gain factor related to a rate of change of $V_{lim}$ with respect to X.

* * * * *